(12) United States Patent
Burckart et al.

(10) Patent No.: US 9,251,270 B2
(45) Date of Patent: Feb. 2, 2016

(54) GROUPING SEARCH RESULTS INTO A PROFILE PAGE

(75) Inventors: Erik J. Burckart, Raleigh, NC (US); Andrew Ivory, Wake Forest, NC (US); Aaron K. Shook, Raleigh, NC (US); David M. Stecher, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 81 days.

(21) Appl. No.: 13/351,623

(22) Filed: Jan. 17, 2012

(65) Prior Publication Data

US 2013/0185284 A1 Jul. 18, 2013

(51) Int. Cl.
*G06F 17/30* (2006.01)
(52) U.S. Cl.
CPC ............................ *G06F 17/30867* (2013.01)
(58) Field of Classification Search
CPC ................. G06F 17/30867; G06F 17/30604; G06F 17/30672
USPC ........... 707/706, 722, 723, 726, 748, E17.141
See application file for complete search history.

(56) References Cited

U.S. PATENT DOCUMENTS

| | | | | |
|---|---|---|---|---|
| 6,144,958 | A * | 11/2000 | Ortega | ............... G06F 17/2725 |
| 7,685,201 | B2 | 3/2010 | Zeng et al. | |
| 7,979,411 | B2 * | 7/2011 | Mattox et al. | ................. 707/706 |
| 7,997,987 | B2 * | 8/2011 | Johnson et al. | ................. 463/42 |
| 8,214,380 | B1 * | 7/2012 | Bettinger et al. | ............ 707/758 |
| 8,429,277 | B2 * | 4/2013 | Dale et al. | ..................... 709/226 |
| 2005/0160167 | A1 * | 7/2005 | Cheng et al. | .................. 709/224 |
| 2007/0136429 | A1 | 6/2007 | Fine et al. | |
| 2007/0192293 | A1 | 8/2007 | Swen | |
| 2008/0091650 | A1 | 4/2008 | Fontoura et al. | |
| 2009/0024614 | A1 * | 1/2009 | Pousti et al. | ...................... 707/5 |
| 2009/0144609 | A1 | 6/2009 | Liang et al. | |
| 2009/0240672 | A1 | 9/2009 | Costello | |
| 2010/0254577 | A1 * | 10/2010 | Vanhoucke et al. | .......... 382/118 |
| 2011/0082859 | A1 | 4/2011 | Deng et al. | |
| 2011/0106807 | A1 * | 5/2011 | Srihari et al. | ................. 707/739 |
| 2012/0191693 | A1 * | 7/2012 | Alexander | .................... 709/226 |
| 2013/0060769 | A1 * | 3/2013 | Pereg et al. | .................... 707/728 |

OTHER PUBLICATIONS

Google Social Search, Google: Inside Search, retrieved Oct. 12, 2011, <http://support.google.com/websearch/bin/answer.py?hl=en&answer=165228>.
International Search Report and Written Opinion, International Application No. PCT/IB2013/050214, dated May 30, 2013.
(Continued)

*Primary Examiner* — Md. I Uddin
(74) *Attorney, Agent, or Firm* — Patterson & Sheridan, LLP (57) ABSTRACT

Methods are disclosed for grouping search results into a profile page. A search engine accepts a user search string and generates a first set of results. In response to the first set of results, a query generator generates queries corresponding to a number of entities sharing a common name. The search engine executes the queries, returning responsive data sets. An entity resolver merges the data sets to ensure that each unique entity is represented by a single data set. A threshold may be defined such that results meeting a certain level of similarity are merged. A profile generator creates a profile page for each unique entity using biographical data contained in the respective data sets and generates a results page containing links to each unique profile. The results page is then sent to the user for display on a graphical user interface.

15 Claims, 7 Drawing Sheets

(56) References Cited

OTHER PUBLICATIONS

U.S. Appl. No. 13/886,519, entitled Grouping Search Results Into a Profile Page, filed May 3, 2013.

Extended European Search Report, European Application No. EP13738981, International Application No. PCT/IB2013/050214, dated Mar. 12, 2015.

* cited by examiner

GROUPING SEARCH RESULTS INTO A PROFILE PAGE

BACKGROUND

Embodiments of the disclosure relate to the field of search engines. More specifically, embodiments of the disclosure relate to generating a specific profile page for each unique entity sharing a common name with other entities, and presenting links to each profile page as a list of search results responsive to a user search string specifying the common name.

DESCRIPTION OF THE RELATED ART

Search engines provide computer users a way to search an ever-expanding set of documents available on a network, for example, the Internet, in a matter of seconds. Search engines use complex algorithms to score and rank individual documents, or pages, to present the most relevant and accurate results in response to a user-specified search string. When a user searches a name which is shared among multiple entities, be it a person, place, organization, or other entity, current methods involve intense statistical computation of vast sets of data to determine which of the plurality of entities the user was seeking and may not provide complete and meaningful results corresponding to the entity.

SUMMARY

One embodiment disclosed herein includes a computer-implemented method for presenting profile pages generated in response to a search engine search string specifying a common name shared by multiple entities. The operation may generally include receiving, from a user, a first search string specifying the name of an entity which is a common name shared by multiple entities; generating a plurality of queries based on the results of the first search string; executing each of the plurality of generated queries to create a respective set of search results; resolving each of the respective sets of search results such that each entity is represented by a single set of search results; generating a plurality of profiles, each profile corresponding to one of the resolved sets of search results; and presenting the plurality of profiles as a set of results responsive to the first search string to an output device.

Another embodiment disclosed herein provides a computer readable medium containing a program which, when executed on a system including a processor and memory, performs an operation, generally comprising receiving, from a user, a first search string specifying the name of an entity which is a common name shared by multiple entities; generating a plurality of queries based on the results of the first search string; executing each of the plurality of generated queries to create a respective set of search results; resolving each of the respective sets of search results such that each entity is represented by a single set of search results; generating a plurality of profiles, each profile corresponding to one of the resolved sets of search results; and presenting the plurality of profiles as a set of results responsive to the first search string to an output device.

Another embodiment disclosed herein provides a system that receives, from a user, a first search string specifying the name of an entity which is a common name shared by multiple entities. The system generates a plurality of queries based on the results of the first search string, executes each of the plurality of generated queries to create a respective set of search results, and resolves each of the respective sets of search results such that each entity is represented by a single set of search results. The system generates a plurality of profiles, each profile corresponding to one of the resolved sets of search results and presents the plurality of profiles as a set of results responsive to the first search string to an output device.

BRIEF DESCRIPTION OF THE DRAWINGS

So that the manner in which the above recited aspects are attained and can be understood in detail, a more particular description of embodiments of the disclosure, briefly summarized above, may be had by reference to the appended drawings.

It is to be noted, however, that the appended drawings illustrate only typical embodiments of the disclosure and are therefore not to be considered limiting of its scope, for the disclosure may admit to other equally effective embodiments.

DETAILED DESCRIPTION

Search engines are extremely powerful computational tools which help users find relevant documents among the potentially infinite corpus being searched. When a user submits a search string, the search engine performs a complex series of operations to generate a list of the most relevant results responsive to the string. Acknowledging the reality that a search may not be responsive to the user search string, modern search engines provide related search strings in addition to the results, and allow users to modify their search accordingly.

A larger problem arises when a user searches a common name shared by multiple individual entities. For example, a search of the name "John Smith" returns results for many different people. The search engine may return results for the Mormon religious leader, the explorer, and the wrestler, among other unique individuals sharing this very common name. Further complicating the matter is that the results returned by a modern search engine will contain a random assortment of links related to any number of the unique entities sharing the common name. In short, the results are not presented in a sufficiently meaningful manner. Furthermore, in the event that the search engine does produce results responsive to the search string, it may not provide links to pages which contain relevant biographical data related to the entity.

Embodiments described herein generally provide a method for automatically generating and executing a plurality of queries responsive to a search string specifying a common name shared by multiple entities. The resulting sets of search results for the respective queries are then resolved such that each entity sharing the name is represented by a single data set. A profile page is then generated for each individual entity sharing the common name. Finally, a page containing a list of links to the profile page for each individual entity is generated and returned as a set of search results responsive to the original search string specifying a common name shared by multiple entities. Thus, in the above "John Smith" example, one embodiment described herein outputs to the user a list of links to each unique John Smith, which, when clicked by the user, displays a profile containing biographical data associated with each unique John Smith.

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present disclsoure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments described herein. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
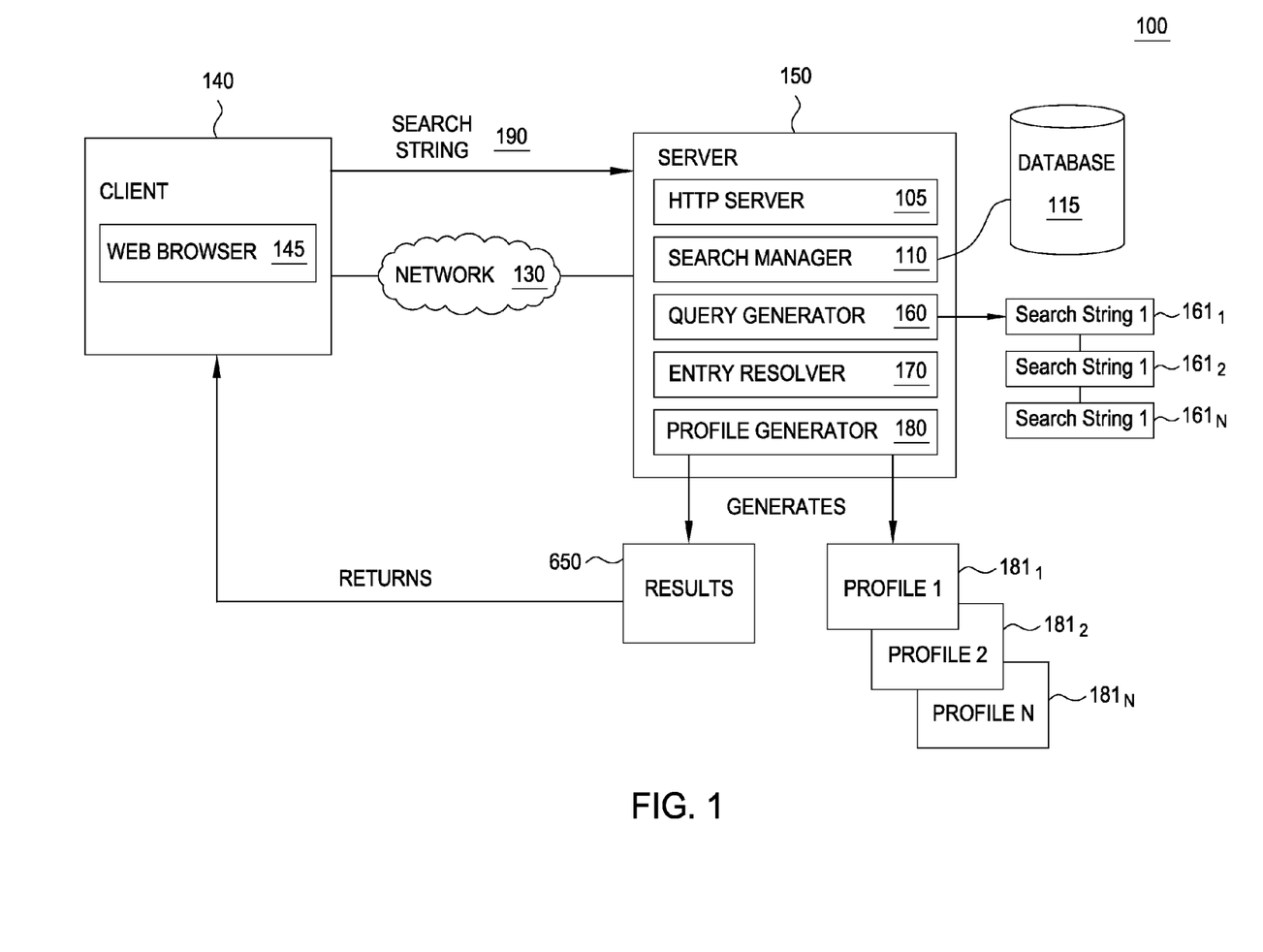
FIG. 1 is a block diagram illustrating an exemplary system for grouping search results into a set of profile pages, according to one embodiment described herein.

FIG. 1 is a block diagram illustrating a system 100 for grouping search results into a profile page, according to one embodiment described herein. In general, the networked system 100 includes a client computer 140 and a server 150. The client 140 and the server 150 are computers as defined in FIG. 7, described in further detail below, and are connected via a network 130. In general, the network 130 may be a telecommunications network and/or a wide area network (WAN). In a particular embodiment, the network 130 is the Internet.

The memory of client computer 140 contains a web browser, which may be used to access search engine pages. The memory of server 150 contains an HTTP server 105, a search manager 110, query generator 160, entity resolver 170, and profile generator 180. Search manager 110 is associated with a database 115, which may be contained in the storage 708 of server 150, or may be contained in the storage of a networked computer. Search manager 110 is an exemplary search engine in that it is configured to receive a search string and return results. Search manager 110 is configured to generate related search strings responsive to a given search string to provide a user with search strings that are more relevant to the given search string. Database 115 is representative of any collection of data regardless of the particular physical representation. By way of illustration, the database 115 may be organized according to a relational schema (accessible by SQL queries) or according to an XML schema (accessible by XML queries). However, embodiments are not limited to a particular schema and contemplate extension to schemas presently unknown. As used herein, the term "schema" generically refers to a particular arrangement of data. Search string 190 is a textual string which, in some embodiments, refers to a person, place, or organization.

Figure 2:
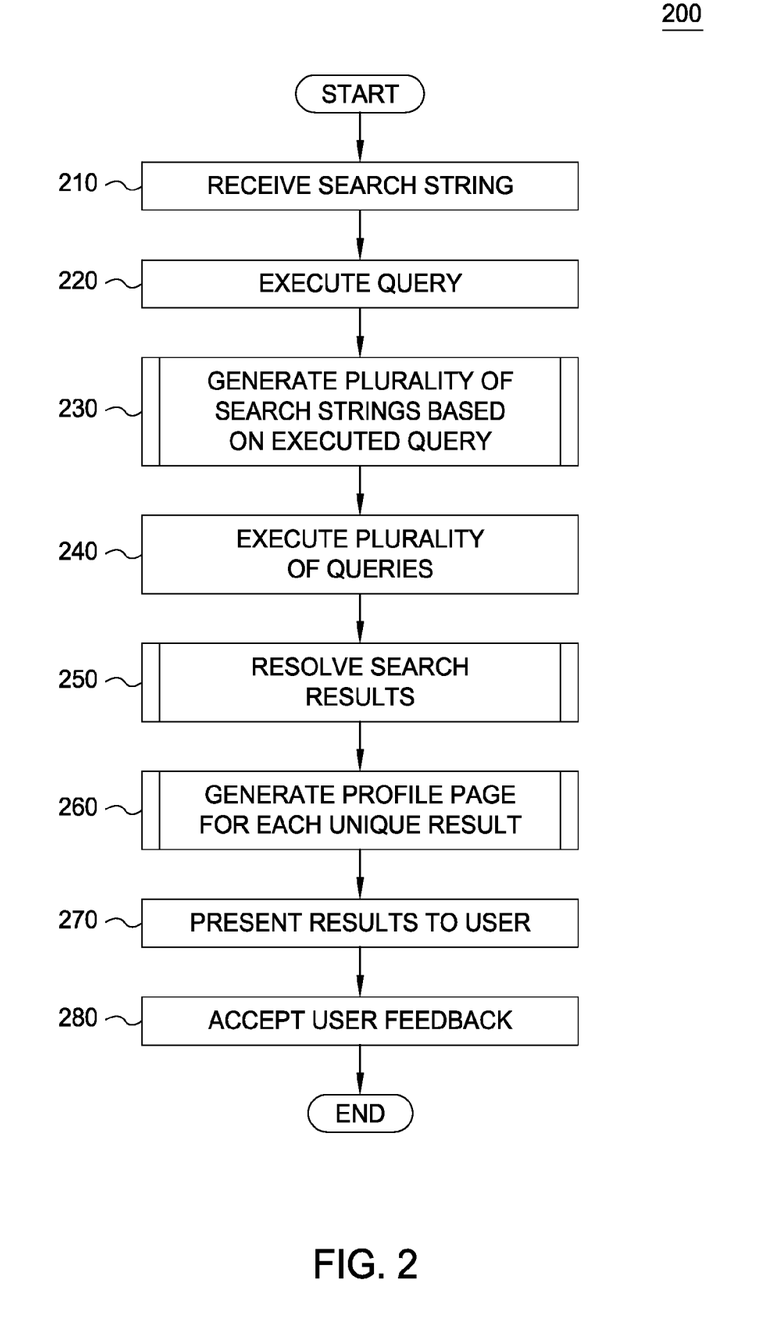
FIG. 2 is a flowchart depicting an exemplary method of grouping search results into a set of profile pages, according to one embodiment described herein.

FIG. 2 is a flowchart outlining one embodiment described herein. At step 210, a user enters a search string 190 through web browser 145, which is transmitted to server 150 via the network 130. At step 220, search manager 110 receives the search string 190, executes a corresponding search against database 115, and returns search results to query generator 160. At step 230, query generator 160 determines whether the search string 190 corresponds to multiple entities sharing a common name, and in response, generates a plurality of search strings $161_{1-N}$ related to the common name. In one embodiment, the related search strings may be taken from the related search strings provided by search manager 110. Query generator 160 then passes each search string $161_{1-N}$ to the search manager 110, which executes the searches and generates results for each search string at step 240. At step 250, entity resolver 170 receives the results of search strings $161_{1-N}$ from search manager 110, and resolves the data sets such that each unique entity is represented by a single set of search results. At step 260, entity resolver 170 passes the resulting sets of data to profile generator 180, which parses each data set to create a profile page $181_{1-N}$ for each unique entity, as well as a results page 650 containing links to each profile page $181_{1-N}$. At step 270, the pages generated by the profile generator are then returned to the client computer 140 through the network 130, where the web browser 145 displays the results on output device 716. At step 280, the user may provide feedback via input device 714 marking each result as relevant or not relevant to search string 190.

Figure 3:
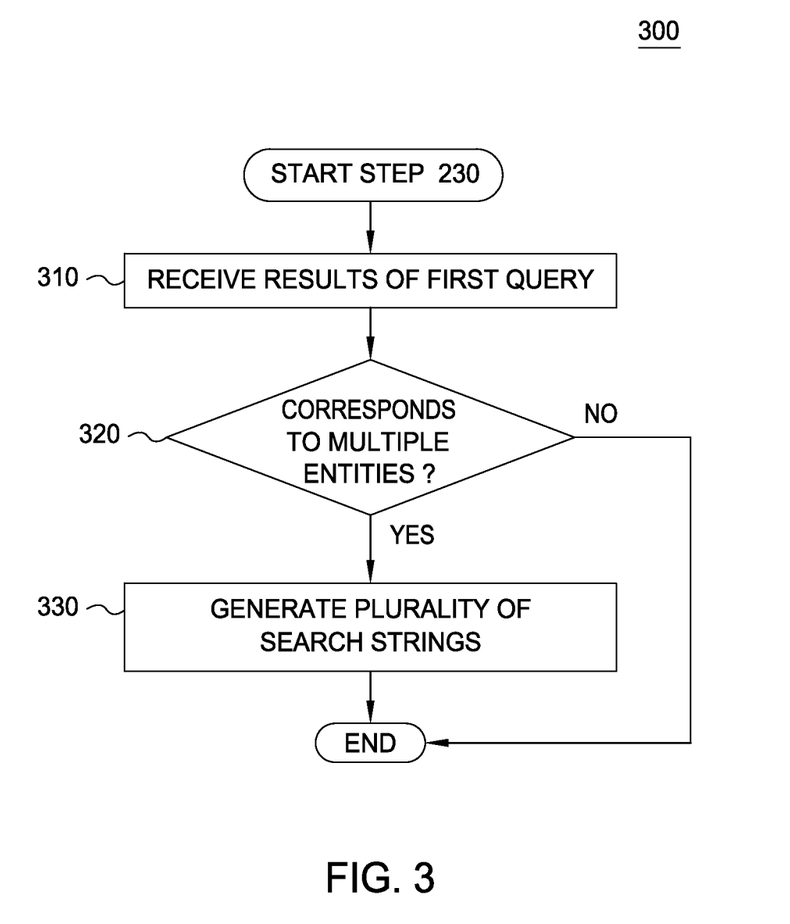
FIG. 3 is a flowchart depicting an exemplary query generator, according to one embodiment described herein.

FIG. 3 is a flowchart showing a method 300 corresponding to step 230 for generating a plurality of search strings associated with query generator 160, according to an embodiment described herein. The method begins at step 310, where the query generator 160 receives from search manager 110 the results of the executed search based on search string 190. At step 320, the query generator 160 analyzes the received search results to determine whether the search string 190 includes a common name shared by multiple entities. In one embodiment, query generator 160 analyzes related search strings returned by search manager 110 to determine whether the search string 190 includes a common name shared by multiple entities. For example, if search string 190 includes "John Smith," the related search results may include "John Smith Mormon," "John Smith wrestler," "John Smith explorer," and "John Smith Pocahontas." Using these related search strings, query generator 160 can identify an ambiguous name which is shared by multiple distinct entities. In one embodiment, query generator 160 analyzes the related search strings, identifying the common name as well as additional terms included in the search. By comparing the additional terms, such as "explorer," "wrestler," and "Mormon," query generator 160 is able to determine that the terms are sufficiently distinct such that they represent multiple entities sharing a common name.

If query generator 160 determines that the search string 190 includes a common name shared by multiple entities, the method proceeds to step 330, where query generator 160 creates a plurality of search strings $161_{1-N}$ for each entity identified at step 320. In one embodiment, the plurality of search strings may be taken from the related search strings identified at step 320. Upon generating the plurality of search strings, query generator 160 sends each string $161_{1-N}$ to search manager 110 for execution.

An issue arises where one or more of the search strings $161_{1-N}$ represent the same distinct entity. For example, as shown above, the generated search strings "John Smith explorer" and "John Smith Pocahontas" in fact refer to the same individual. In such cases, the results generated by search manager 110 in response to search strings $161_{1-N}$ need to be resolved such that each entity is represented by a single set of search results. In one embodiment, this functionality is performed by entity resolver 170.

Figure 4:
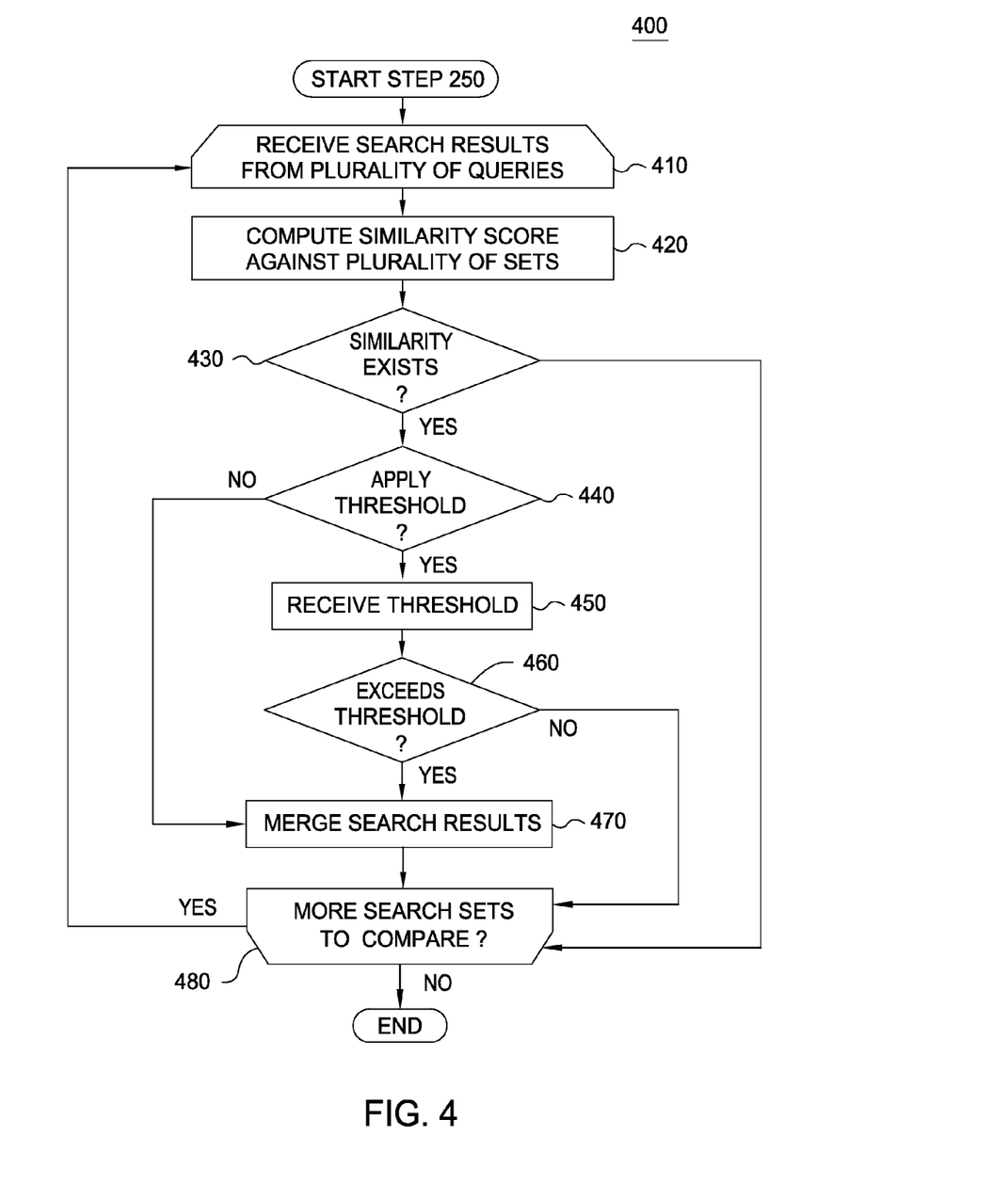
FIG. 4 is a flowchart depicting an exemplary entity resolver, according to one embodiment described herein.

FIG. 4 is a flowchart showing a method 400 corresponding to step 250 for resolving entities associated with entity resolver 170, according to an embodiment described herein. The method begins at 410, where entity resolver 170 receives from search manager 110 the search results of the plurality of search strings $161_{1-N}$ received from query generator 160. The method then proceeds to step 420, where entity resolver 170 compares each set of search results received at step 410 against the other sets of search results to compute a similarity score to determine if a similarity exists. A number of methods can be used to determine whether a similarity exists between the search results. In one embodiment, the similarity score is computed by comparing results to determine if duplicate documents were returned by search manager 110. The greater the number of duplicate documents in the sets of search results, the greater the similarity score. In another embodiment, the similarity score is computed by limiting the comparison to the top search results, and detecting duplicate results among the top results. In another embodiment, the similarity score is correlated to the percentage of documents in each search set which are duplicates. In still another embodiment, the similarity score is computed by comparing the relevance score returned by search manager 110 for each search result.

At step 430, entity resolver 170 analyzes the similarity score to determine if a similarity exists. In one embodiment, the existence of any positive similarity score indicates a similarity. If no similarity is detected, the method proceeds to step 480. Otherwise, the method proceeds to step 440, where entity resolver 170 determines whether a similarity threshold must be applied. A similarity threshold may be used to specify a certain level of similarity before entity resolver 170 identifies two sets of search results as being associated with the same unique entity. If a similarity threshold will not be applied, the method proceeds to step 470. If a similarity threshold is to be applied, the method proceeds to step 450, where entity resolver 170 receives the similarity threshold. The method then proceeds to step 460, where entity resolver determines whether the similarity score exceeds the similarity threshold. If the computed similarity score exceeds the similarity threshold, the method proceeds to step 470; otherwise, the method proceeds to step 480.

At step 470, the entity resolver 170 merges similar search results such that each unique entity N is represented by a single set of search results $171_N$. In one embodiment, the merging comprises retaining the set of search results which is most popular, according to calculations performed by search manager 110. In another embodiment, an algorithm for determining priority is applied by entity resolver 170, wherein a relevance score returned by search manager 110 is used to identify the most relevant search results. The results are then merged, duplicates are eliminated, and the resulting list $171_N$ is sorted in descending order according to relevance score.

At this point the method proceeds to step 480, where entity resolver 470 determines whether there are search result sets $161_{1-N}$ that have not been resolved. If additional sets remain, the method returns to step 410, otherwise the method terminates.

Figure 5:
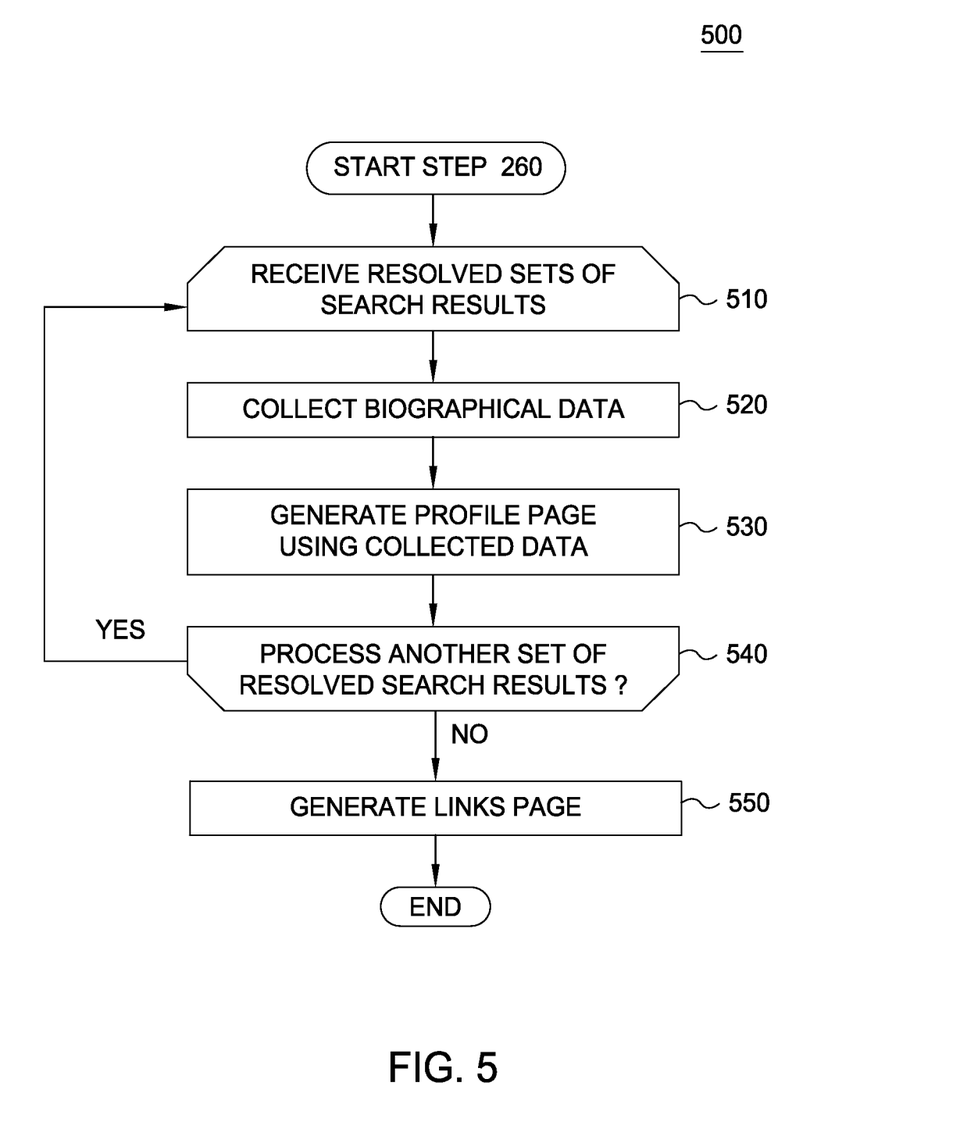
FIG. 5 is a flowchart depicting an exemplary profile generator, according to one embodiment described herein.

FIG. 5 is a flowchart depicting a method 500 corresponding to step 260 for generating profile pages associated with profile generator 180, according to an embodiment described herein. For each set of results $171_{1-N}$ received from entity resolver 170, the profile generator 180 generates a profile page $181_N$ for the associated entity. The method begins at step 510, where the profile generator receives the resolved sets of search results $171_{1-N}$ from entity resolver 170. The method proceeds to step 520, where profile generator collects biographical profile data from documents contained in the resolved search sets. In one embodiment, social networking site pages are prioritized, and biographical data is collected from these sources. A social networking site allows users to create a personalized page populated with biographical data, photos, and other items. Sites such as Facebook, LinkedIn, and Google+ are examples of social networking sites. Data from these social networking sites is prioritized due to the high level of reliability of the information contained in a profile. When detected, profile pages from these sites are ranked at the top of the resolved data sets $171_{1-N}$. In another embodiment, biographical data is collected from only the top ranked search results in the data sets $171_{1-N}$ returned by entity resolver 170.

At step 530, profile generator 180 creates a profile page $181_N$ for the data set $171_N$ returned by entity resolver 170. The method then proceeds to step 540, where profile generator 180 determines whether a profile needs to be created for the next member of the data sets $171_{N+1}$. If additional profiles need to be created, the method returns to step 510 for generation of additional profiles. Otherwise, the method proceeds to step 550, where the profile generator 170 creates a page 650 containing links to each profile page $181_{1-N}$, which is returned via the network 130 to the client 140 as a list of results responsive to search string 190, to be displayed on output device 114.

Figure 6A:
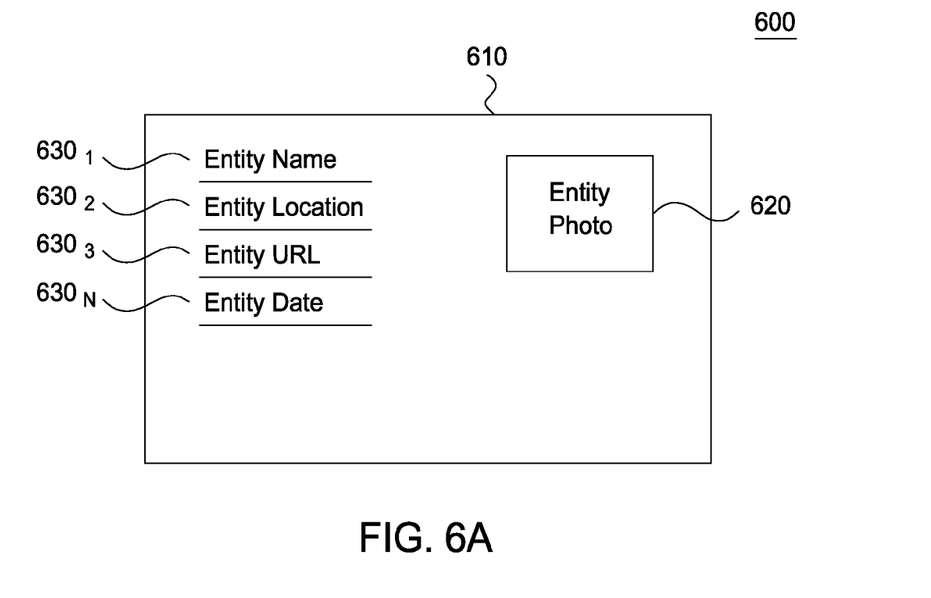
FIG. 6A illustrates an exemplary graphical user interface (GUI) screen displaying an exemplary profile page generated for an entity, according to one embodiment described herein.

FIG. 6A illustrates a graphical user interface 600 depicting an exemplary profile page 610 corresponding to profile page $181_N$ generated by profile generator 180, according to an embodiment described herein. Those skilled in the art will recognize that the GUI 600 is exemplary and is not intended to limit the disclosure. Profile page 610 is populated with biographical data related to a unique entity sharing the common name defined in search string 190. In one embodiment, a photo 620 of the entity may be displayed. The profile also contains data elements $630_{1-N}$ related to the entity. In this example, the entity name, location, and URLs are provided. The data elements $630_{1-N}$ contained in profile page 610, of course, may be of any type of data.

Figure 6B:
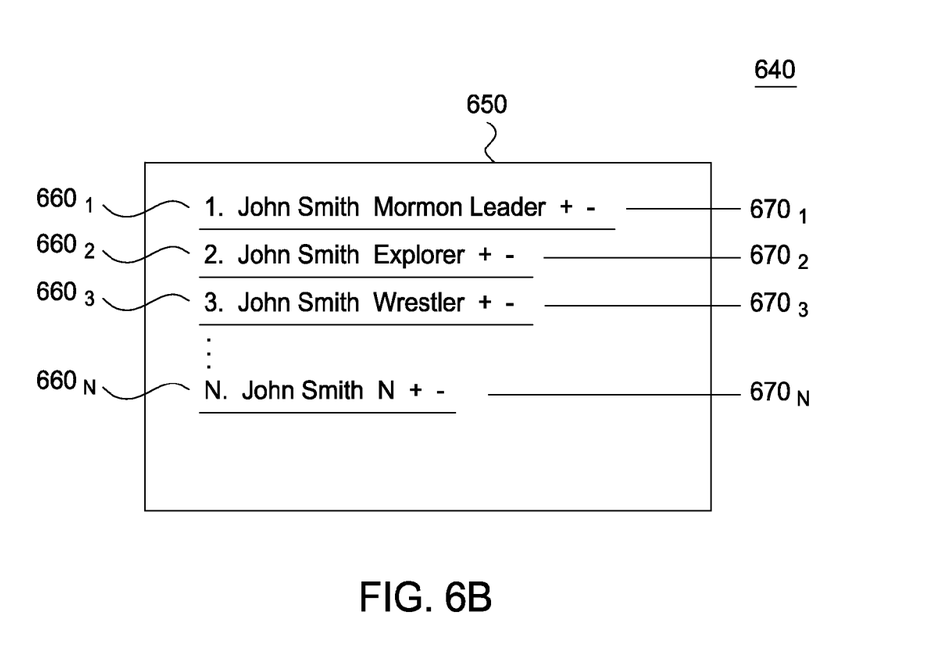
FIG. 6B illustrates an exemplary GUI screen showing results from a profile generator, according to one embodiment described herein.

FIG. 6B illustrates a graphical user interface 640 depicting an exemplary results page 650 according to an embodiment described herein. Those skilled in the art will recognize that the GUI 640 is exemplary and is not intended to limit the disclosure. Results page 650 is a document containing hyperlinks $660_{1-N}$ corresponding to a profile page $181_{1-N}$ created by profile generator 180. For example, FIG. 6B shows a hyperlink $660_1$ which is a hyperlink to the profile page generated for "John Smith Mormon Leader." Hyperlink $660_2$ is a hyperlink to the profile page generated for "John Smith Explorer," and hyperlink $660_3$ is a target to the profile page generated for "John Smith Wrestler."

In addition, the hyperlinks $660_{1-N}$ are associated with feedback tags $670_{1-N}$, which allow the user to provide feedback as to whether the result is relevant to their search. For example, the feedback tags may be a "+" or "−" used to indicate that the result was responsive or not responsive to the search string 190, respectively. The user feedback may be implemented in future searches, or may modify the results of the current search.

Figure 7:
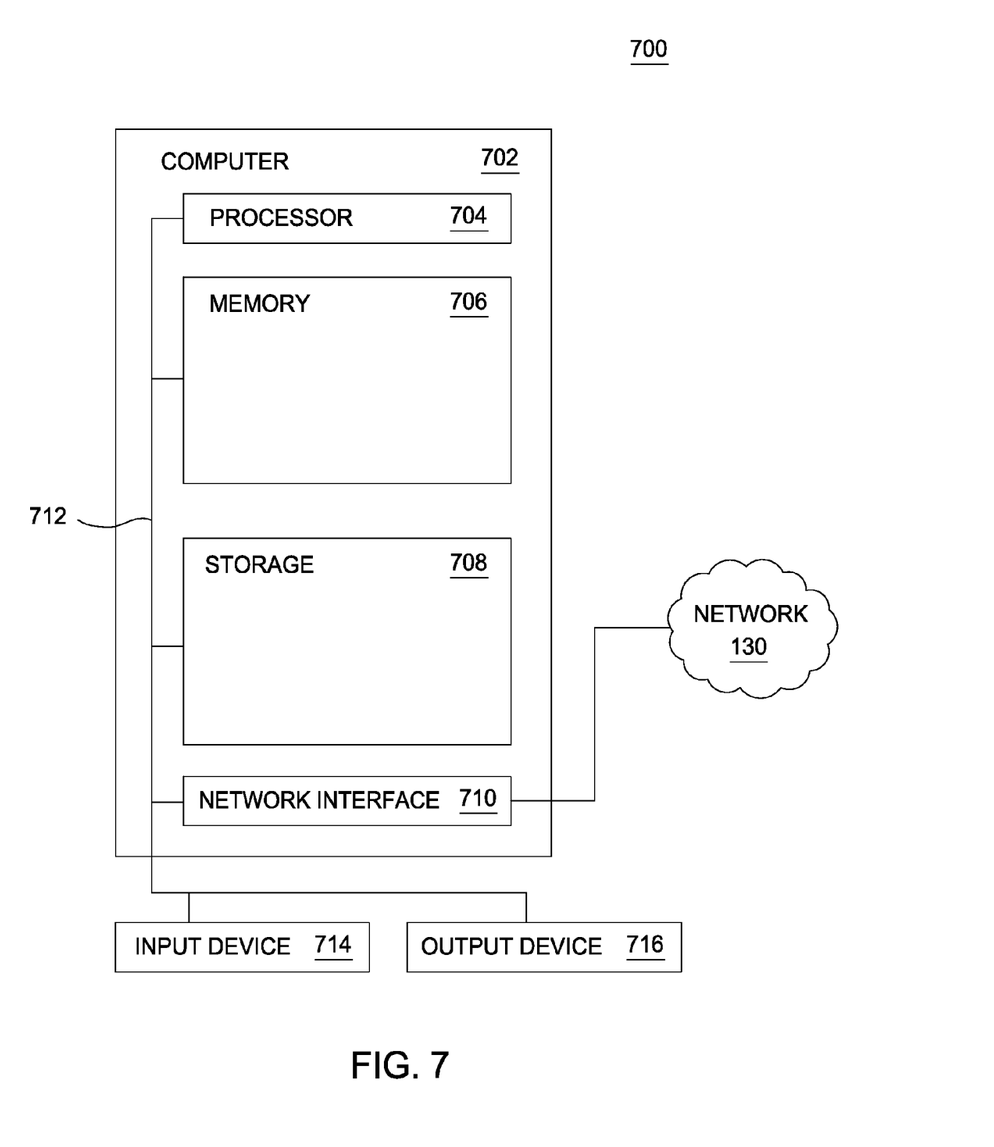
FIG. 7 depicts an exemplary system according to one embodiment described herein.

FIG. 7 is a block diagram illustrating an exemplary computer 702 used in some embodiments described herein. The computer 702 includes at least one processor 704 connected via a bus 712 to a memory 706, a network interface device 710, a storage 708, an input device 714, and an output device 716. The processor 104 could be any hardware processor used to perform an embodiment of the disclosure. The input device 714 can be any device to give input to the computer 702. For example, a keyboard, keypad, light-pen, touch-screen, trackball, or speech recognition unit, audio/video player, and the like could be used. The output device 716 can be any device to give output to the user, e.g., any conventional display screen. Although shown separately from the input device 714, the output device 716 and input device 714 could be combined. For example, a display screen with an integrated touch-screen, a display with an integrated keyboard, or a speech recognition unit combined with a text speech converter could be used.

The computer 702 is generally under the control of an operating system (not shown). Examples of operating systems include UNIX, versions of the Microsoft Windows® operating system, and distributions of the Linux® operating system. (Note: Linux is at trademark of Linus Torvalds in the United States and other countries.) More generally, any operating system supporting the functions disclosed herein may be used.

The memory 706 is preferably a random access memory sufficiently large to hold the necessary programming and data structures in embodiments described herein. While the memory 706 is shown as a single entity, it should be understood that the memory 706 may in fact comprise a plurality of modules, and that the memory 706 may exist at multiple levels, from high speed registers and caches to lower speed but larger DRAM chips.

The storage 708 may be a Direct Access Storage Device (DASD). Although the storage 708 is shown as a single unit, the storage 708 may be a combination of fixed and/or removable storage devices, such as fixed disc drives, floppy disc drives, tape drives, removable memory cards, or optical storage. The memory 706 and the storage 708 may be part of one virtual address space spanning multiple primary and secondary storage devices.

The flowchart and block diagrams in the Figures illustrate the architecture, functionality, and operation of possible implementations of systems, methods and computer program products according to various embodiments disclosed herein. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A computer program product for grouping search results into a profile page, the computer program product comprising:
   a computer-readable storage medium having computer-readable program code embodied therewith, the computer-readable program code executable by a processor to perform an operation comprising:
      receiving, from a client, a first search string specifying one or more search terms;
      receiving a first set of search results for the first search string;
      determining that at least one of the one or more search terms is a shared term corresponding to a plurality of entities based on a comparison of at least two additional terms in the first set of search results, wherein the additional terms are different than the shared term;
      generating a plurality of search queries based on the first search string, each search query corresponding to an entity in the plurality of entities, wherein a first two of the generated search queries correspond to the same entity in the plurality of entities, wherein each of a second two of the generated queries correspond to distinct entities in the plurality of entities;
      executing each of the generated plurality of search queries to create a respective set of search results, wherein executing the second two of the generated search queries produces two distinct sets of search results;
      resolving the sets of search results such that each of the plurality of entities is represented by a single set of search results, whereby the first two generated search queries corresponding to the same entity produce a respective single set of search results, wherein a similarity score for the search results produced for the first two generated search queries exceeds a threshold, wherein the similarity score is based on a percentage of documents in the sets of search results representing the first two generated search queries that are common to each of the sets of search results representing the first two generated search queries;
      generating a plurality of profiles, each corresponding to one of the resolved sets of search results, wherein each of the plurality of profiles comprises biographical data obtained from at least one document in the corresponding set of resolved search results;
      outputting a results page comprising a plurality of links, each of the plurality of links directed to a respective one of the plurality of profiles;
      receiving user feedback marking a first profile, of the plurality of profiles, as not relevant to the first search string;
      removing the link to the first profile from the results page based on the user feedback, thereby producing a modified results page; and
      outputting the modified results page as responsive to the first search string.

2. The computer program product of claim 1, wherein each of the plurality of entities comprises at least one of a person, a place, or an organization.

3. The computer program product of claim 1, wherein the plurality of search queries is further generated based on each of: (i) a set of related search strings generated in response to the first search string, and (ii) a set of distinct terms included in the set of related search strings.

4. The computer program product of claim 1, wherein the resolving comprises:
   identifying at least two of the sets of search results that correspond to the same entity in the plurality of entities;
   computing the similarity score for the identified search results; and
   merging the identified sets of search results.

5. The computer program product of claim 1, the operation further comprising:
   receiving user feedback that marks at least one data element in a profile as relevant or not relevant to that profile.

6. A system, comprising:
   a processor; and
   a memory containing a program, which when executed by the processor is configured to perform an operation for grouping search results into a profile page, the operation comprising:
      receiving, from a client, a first search string specifying one or more search terms;
      receiving a first set of search results for the first search string;
      determining that at least one of the one or more search terms is a shared term corresponding to a plurality of entities based on a comparison of at least two additional terms in the first set of search results, wherein the additional terms are different than the shared term;
      generating a plurality of search queries based on the first search string, each search query corresponding to an entity in the plurality of entities, wherein a first two of the generated search queries correspond to the same entity in the plurality of entities, wherein each of a second two of the generated queries correspond to distinct entities in the plurality of entities;
      executing each of the generated plurality of search queries to create a respective set of search results, wherein executing the second two of the generated search queries produces two distinct sets of search results;
      resolving the sets of search results such that each of the plurality of entities is represented by a single set of search results, whereby the first two generated search queries corresponding to the same entity produce a respective single set of search results, wherein a similarity score for the search results produced for the first two generated search queries exceeds a threshold, wherein the similarity score is based on a percentage of documents in the sets of search results representing the first two generated search queries that are common to each of the sets of search results representing the first two generated search queries;

generating a plurality of profiles, each corresponding to one of the resolved sets of search results, wherein each of the plurality of profiles comprises biographical data obtained from at least one document in the corresponding set of resolved search results;

outputting a results page comprising a plurality of links, each of the plurality of links directed to a respective one of the plurality of profiles;

receiving user feedback marking a first profile, of the plurality of profiles, as not relevant to the first search string;

removing the link to the first profile from the results page based on the user feedback, thereby producing a modified results page; and outputting the modified results page as responsive to the first search string.

7. The system of claim 6, wherein each of the plurality of entities comprises at least one of a person, a place, or an organization.

8. The system of claim 6, wherein the plurality of search queries is further generated based on each of: (i) a set of related search strings generated in response to the first search string, and (ii) a set of distinct terms included in the set of related search strings.

9. The system of claim 6, wherein the resolving comprises:
identifying at least two of the sets of search results that correspond to the same entity in the plurality of entities;
computing the similarity score for the identified search results; and
merging the identified sets of search results.

10. The system of claim 6, the operation further comprising:
receiving user feedback that marks at least one data element in a profile as relevant or not relevant to that profile.

11. The system of claim 6, wherein each of the plurality of entities comprises at least one of a person, a place, or an organization, wherein the plurality of search queries is further generated based on each of: (i) a set of related search strings generated in response to the first search string, and (ii) a set of distinct terms included in the set of related search strings.

12. The system of claim 11, the operation further comprising:
receiving user feedback marking a second profile as relevant to the search string; and
ranking a second link of the plurality of profile links before a third link of the plurality of profile links, wherein the third link was ranked above the second link in the results page prior to receiving the user feedback marking the second profile, wherein the second link is directed to the second profile.

13. The system of claim 11, the operation further comprising:
receiving user feedback marking a second profile as relevant to the search string; and
removing at least a second link from the results page, wherein the second link is directed to a second profile.

14. The system of claim 11, the operation further comprising:
responsive to receiving the feedback marking the first profile as not relevant to the search string, ranking at least a second link of the plurality of profile links before the first link, wherein the second link was ranked after the first link prior to removing the first link, wherein the first link is directed to the first profile.

15. The system of claim 11, the operation further comprising:
responsive to receiving feedback marking a second profile as not relevant to the search string, removing a second link corresponding to the second profile from the results page.

* * * * *